United States Patent [19]
Goldstein

[11] Patent Number: 5,884,501
[45] Date of Patent: Mar. 23, 1999

[54] ICE-MAKING MACHINE AND HEAT EXCHANGER THEREFOR

[76] Inventor: Vladimir Goldstein, 54 Kingsworth Rd., King City, Ontario, Canada, L0G 1K0

[21] Appl. No.: 633,704

[22] Filed: Apr. 19, 1996

[51] Int. Cl.⁶ .................................................... F25C 1/14
[52] U.S. Cl. .............................. 62/342; 62/354; 165/147; 366/147
[58] Field of Search ............................ 62/342, 343, 354, 62/123; 366/147; 165/147

[56] References Cited

U.S. PATENT DOCUMENTS

| | | |
|---|---|---|
| 3,145,017 | 8/1964 | Thomas ...................................... 62/343 |
| 3,255,815 | 6/1966 | Smith ...................................... 366/147 |
| 3,328,972 | 7/1967 | Svanoe ...................................... 62/123 |
| 3,534,563 | 10/1970 | Ross ...................................... 62/354 |
| 4,159,740 | 7/1979 | Seiling ...................................... 165/147 |
| 4,250,718 | 2/1981 | Brantley ...................................... 62/354 |
| 4,682,475 | 7/1987 | Nelson . |
| 4,796,441 | 1/1989 | Goldstein ...................................... 62/354 |
| 5,099,913 | 3/1992 | Kadle ...................................... 165/147 |
| 5,312,184 | 5/1994 | Cocchi ...................................... 62/343 |
| 5,431,027 | 7/1995 | Carpenter . |
| 5,488,836 | 2/1996 | Laude-Bousquet . |

FOREIGN PATENT DOCUMENTS

| | | |
|---|---|---|
| 641 980 | 3/1995 | European Pat. Off. . |
| 2 232 469 | 12/1990 | United Kingdom . |

*Primary Examiner*—William E. Tapolcai
*Attorney, Agent, or Firm*—Spencer & Frank

[57] ABSTRACT

An ice-making machine includes a housing having a brine solution inlet to receive brine solution from which ice is to be made and having an ice-brine slurry outlet to permit the egress of an ice-brine slurry from the housing. A heat exchanger within the housing has a heat exchange surface. The heat exchanger further includes a refrigerant inlet, a refrigerant outlet and at least one refrigerant circuit interconnecting the refrigerant inlet and the refrigerant outlet to permit a flow of refrigerant through the heat exchanger to extract heat from the brine solution contacting the heat exchange surface. The at least one refrigerant circuit is constituted by refrigerant passages integrally formed in a body portion of the housing. A blade assembly within the housing carries a plurality of blades each of which is in contact with the heat exchange surface. The blade assembly is mounted on a shaft which is rotatable by a motor to move the blades across the heat exchange surface to remove cooled fluid therefrom and inhibit the deposition of ice crystals on the heat exchange surface.

47 Claims, 7 Drawing Sheets

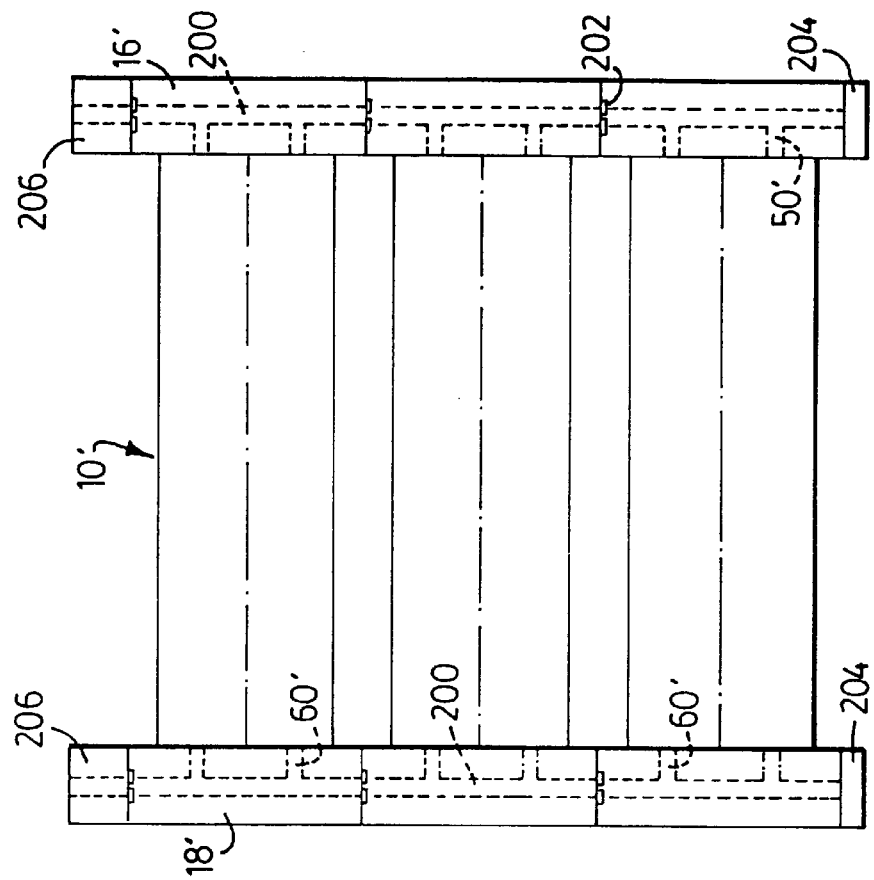
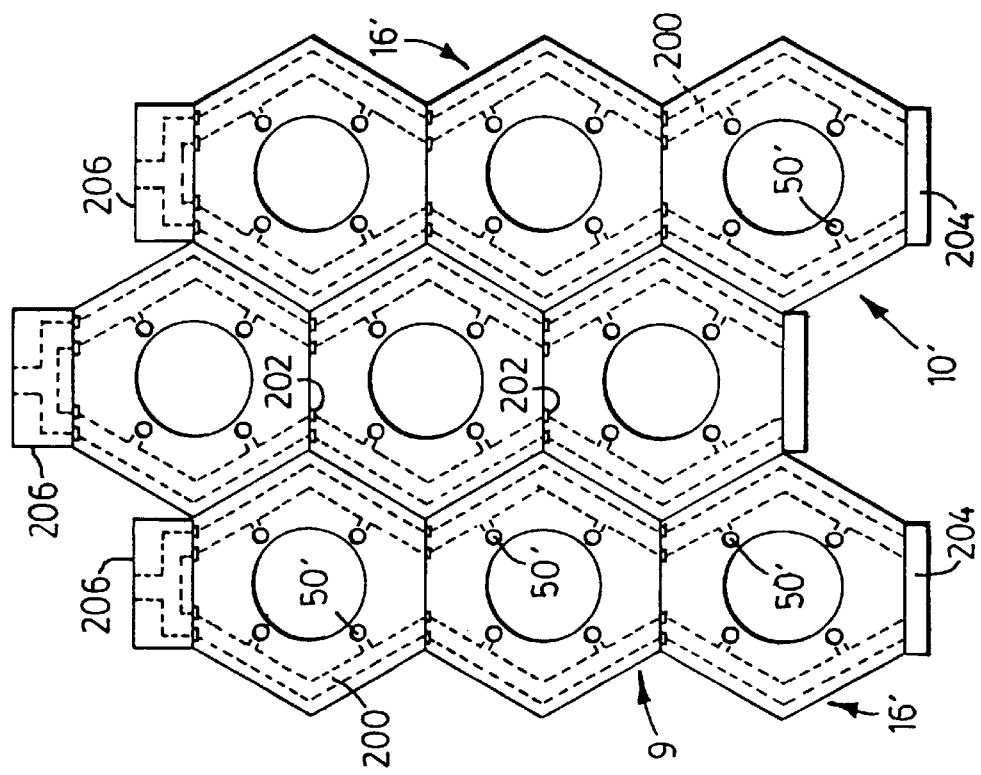

ICE-MAKING MACHINE AND HEAT EXCHANGER THEREFOR

FIELD OF THE INVENTION

The present invention relates to ice-making machines and in particular to an ice-making machine having a heat exchanger body with integrally formed refrigerant passages therein and to a heat exchanger therefor.

BACKGROUND OF THE INVENTION

Ice-making machines are well known in the art and many designs have been considered. For example, Applicant's U.S. Pat. No. 4,796,441 issued on Jan. 10, 1989 discloses an ice-making machine having a chamber with a fluid inlet to receive a brine solution from which ice is to be made and a fluid outlet to permit the egress of an ice-brine slurry from the housing. The interior surface of the chamber defines a heat exchange surface. A blade assembly is mounted on a rotatable shaft extending through the centre of the chamber. The blade assembly is in contact with the heat exchange surface. A motor rotates the shaft at a rate such that the interval between successive passes of the blade assembly over the heat exchange surface is such so as to inhibit the formation of ice crystals on the heat exchange surface.

A tubular jacket surrounds the chamber. A refrigerant inlet and a refrigerant outlet communicate with the space between the jacket and chamber and are positioned at opposed ends of the ice-making machine. Refrigerant flowing from the inlet to the outlet boils and in so doing, cools the brine solution in contact with the heat exchange surface. Refrigerant leaving the ice-making machine via the outlet is compressed before being fed back to the inlet. Rings are welded to the jacket at laterally spaced locations to provide structural stability to the ice-making machine allowing it to withstand internal pressures. Although this ice-making machine works satisfactorily, it is time consuming and expensive to manufacture. Accordingly, improved but less expensive ice-making machines with increased efficiency are continually being sought.

It is therefore an object of the present invention to provide a novel ice-making machine and a heat exchanger therefor.

SUMMARY OF THE INVENTION

According to one aspect of the present invention there is provided an ice-making machine comprising:

a housing having an inlet to receive a fluid from which ice is to be made and an outlet to permit the egress of ice from said housing;

a heat exchanger within said housing having at least one heat exchange surface, said heat exchanger further including a refrigerant inlet, a refrigerant outlet and at least one refrigerant circuit interconnecting said refrigerant inlet and said refrigerant outlet to permit a flow of refrigerant through said heat exchanger to extract heat from fluid contacting said at least one heat exchange surface, said at least one refrigerant circuit being constituted by refrigerant passages integrally formed in a body portion said housing;

blade means in contact with said at least one heat exchange surface and movable about an axis to move across said at least one heat exchange surface and remove cooled fluid therefrom; and drive means to move said blade means across said at least one heat exchange surface.

In a preferred embodiment, the heat exchanger includes a plurality of refrigerant circuits, each of which is connected to the refrigerant inlet and outlets and is constituted by a plurality of refrigerant passages formed in the housing. It is preferred that the cross-sectional area of the refrigerant passages in each of the refrigerant circuits increases from the refrigerant inlet to the refrigerant outlet. Furthermore, it is preferred that the refrigerant passages are positioned in the refrigerant circuits relative to one another to equalize heat exchange between the fluid and the refrigerant along the refrigerant circuits.

According to another aspect of the present invention there is provided an ice-making machine comprising:

a housing having an inlet to receive a fluid from which ice is to be made and having an outlet to permit the egress of ice from said housing;

a heat exchanger within said housing having at least one heat exchange surface, said heat exchanger further including a refrigerant inlet, a refrigerant outlet and at least one refrigerant circuit interconnecting said refrigerant inlet and said refrigerant outlet to permit a flow of refrigerant through said heat exchanger to extract heat from fluid contacting said at least one heat exchange surface, said at least one refrigerant circuit increasing in cross-sectional dimension from said refrigerant inlet to said refrigerant outlet;

blade means in contact with said at least one heat exchange surface and movable about an axis to move across said at least one heat exchange surface and remove cooled fluid therefrom; and drive means to move said blade means across said at least one heat exchange surface.

According to still yet another aspect of the present invention there is provided an ice-making machine comprising:

a housing having an inlet to receive a fluid from which ice is to be made and having an outlet to permit the egress of ice from said housing;

a heat exchanger within said housing having at least one heat exchange surface, said heat exchanger further including a refrigerant inlet, a refrigerant outlet and at least one refrigerant circuit interconnecting said refrigerant inlet and said refrigerant outlet to permit a flow of refrigerant through said heat exchanger to extract heat from fluid contacting said at least one heat exchange surface;

blade means in contact with said at least one heat exchange surface and movable about an axis to move across said at least one heat exchange surface and remove cooled fluid therefrom, said blade means including a blade carrier having a plurality of circumferentially spaced fluid passages therethrough to direct fluid entering said housing via said inlet towards said at least one heat exchange surface; and drive means to move said blade means across said at least one heat exchange surface.

According to still yet another embodiment of the present invention there is provided an ice-making machine comprising:

a housing having an inlet to receive a fluid from which ice is to be made and having an outlet to permit the egress of ice from said housing;

a heat exchanger within said housing having at least one heat exchange surface, said heat exchanger further including a refrigerant inlet, a refrigerant outlet and at least one refrigerant circuit interconnecting said refrigerant inlet and said refrigerant outlet to permit a flow of refrigerant through said heat exchanger to extract heat from fluid contacting said at least one heat exchange surface;

blade means in contact with said at least one heat exchange surface and movable about an axis to move across said at least one heat exchange surface and remove cooled fluid therefrom, said blade means including a blade carrier having a plurality of equally spaced circumferentially disposed blades thereon contacting said heat exchange surface, said blades being flexibly mounted on said blade carrier and pivoting towards said blade carrier in the event of ice accumulation on said heat exchange surface, said blade means also including and scraper elements on said blade carrier and being spaced from said at least one heat exchange surface, said scraper elements scrapping ice accumulated on said at least one heat exchange surface to limit accumulation thereof; and drive means to move said blade means across said at least one heat exchange surface.

According to still yet another aspect of the present invention there is provided a heat exchanger for an ice-making machine comprising:

a generally cylindrical body having an interior surface constituting a heat exchange surface; and at least one refrigerant circuit constituted by a plurality of refrigerant passages integrally formed in said body.

The present invention provides advantages in that since the body of the heat exchanger is extruded and is formed with integral refrigerant passages, the ice-making machine is less expensive to manufacture, easy to assemble and can be mass produced. Also, the modular design of the ice-making machine allows a plurality of ice-making machines to be interconnected to achieve the desired capacity while maintaining individual refrigerant and/or brine solution inlets and outlets. In addition, the present invention provides advantages in that fine ice particles in a brine solution can be made efficiently by increasing and equalizing heat transfer between the brine solution and the refrigerant over basically the entire heat exchange surface within the ice-making machine. In a particular embodiment, this is achieved by increasing the cross-sectional area of the refrigerant passages in the refrigerant circuits along their length from the refrigerant inlet to the refrigerant outlet and by positioning the refrigerant passages in the refrigerant circuits relative to one another to equalize heat exchange between the fluid and the refrigerant.

BRIEF DESCRIPTION OF THE DRAWINGS

Embodiments of the present invention will now be described more fully with reference to the accompanying drawings in which:

FIG. 8 is a front elevational view of a plurality of stacked ice-making machines in accordance with the present invention; and FIG. 9 is a side elevational view of the stacked ice-making machines of FIG. 8 taken in the direction of FIG. 8.

DESCRIPTION OF THE PREFERRED EMBODIMENT

Figure 1:
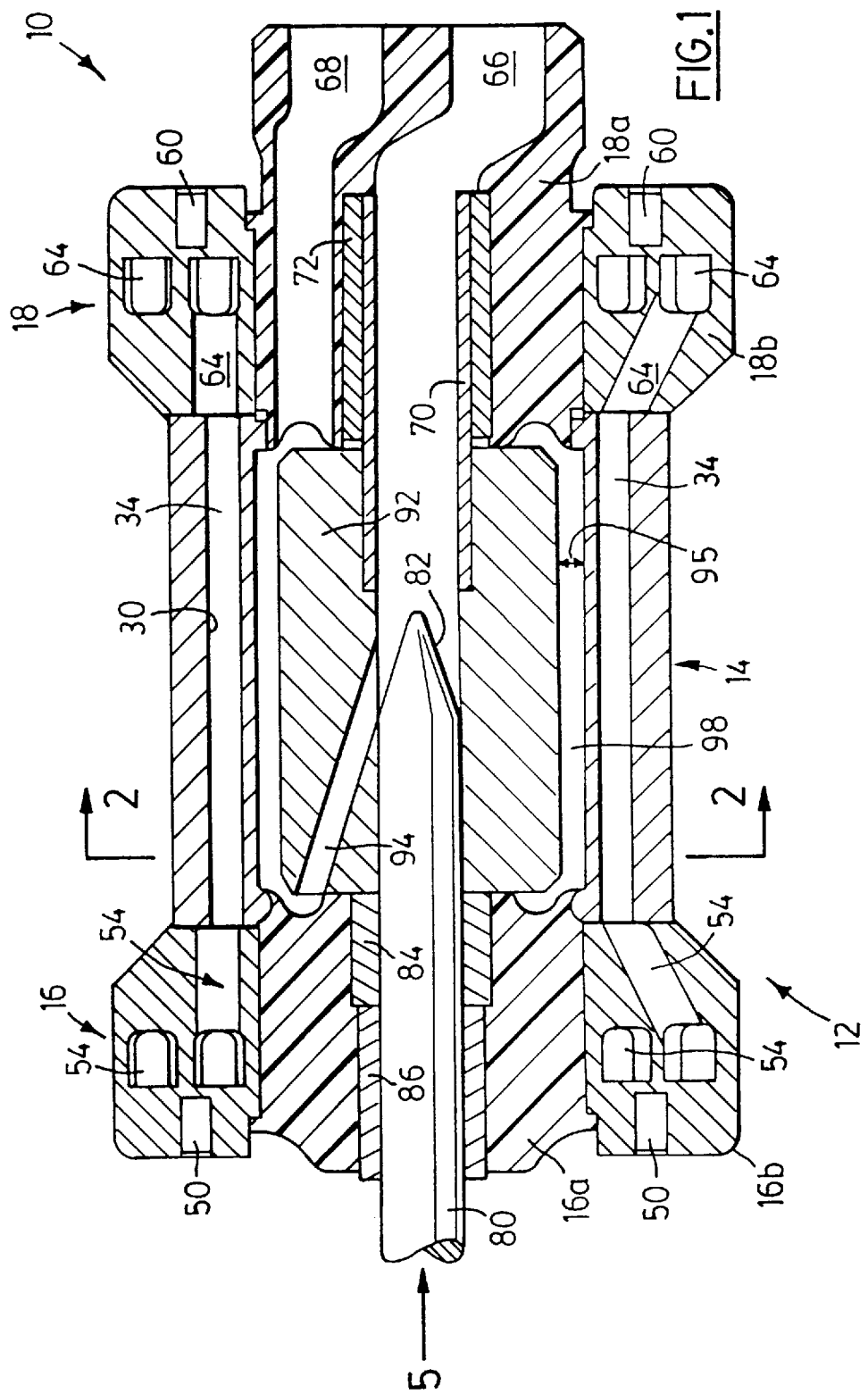
FIG. 1 is a cross-sectional view of an ice-making machine in accordance with the present invention.
Figure 3:
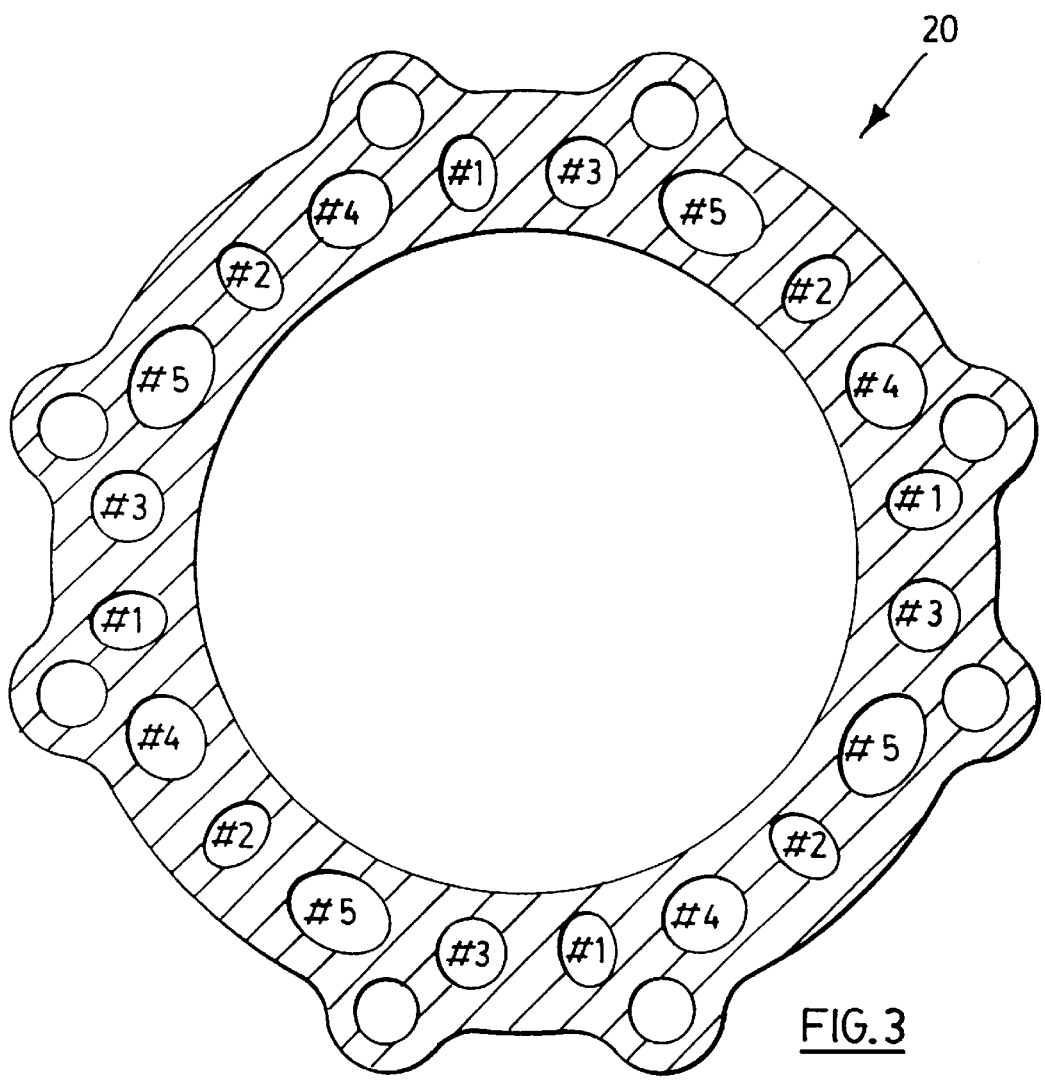
FIG. 3 is an end view of a gasket forming part of the ice-making machine of FIG. 1.

Referring now to FIG. 1, an ice-making machine is shown and is generally indicated to by reference numeral 10. As can be seen, ice-making machine 10 includes a generally cylindrical housing 12 constituted by a cylindrical central body portion 14 and a pair of end plates 16 and 18 respectively secured to the ends of the central body portion 14 by suitable fasteners (not shown). Gaskets 20 (best seen in FIG. 3) are positioned between the end plates 16 and 18 and the central body portion 14 to seal the housing 12 and inhibit fluid leakage.

Figure 2:
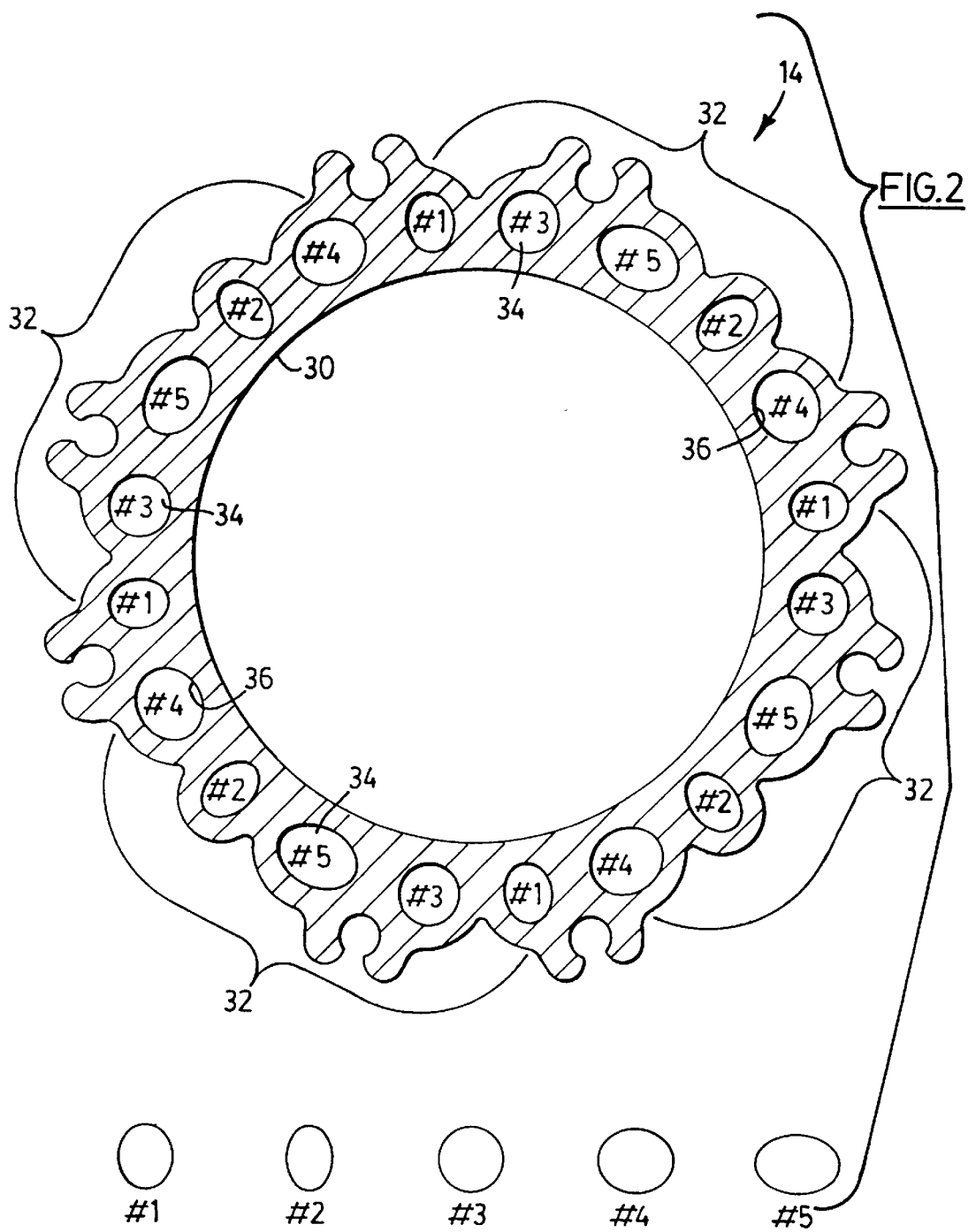
FIG. 2 is a cross-sectional view of the body of the ice-making machine heat exchanger taken along the line 2—2 in FIG. 1.
Figure 6:
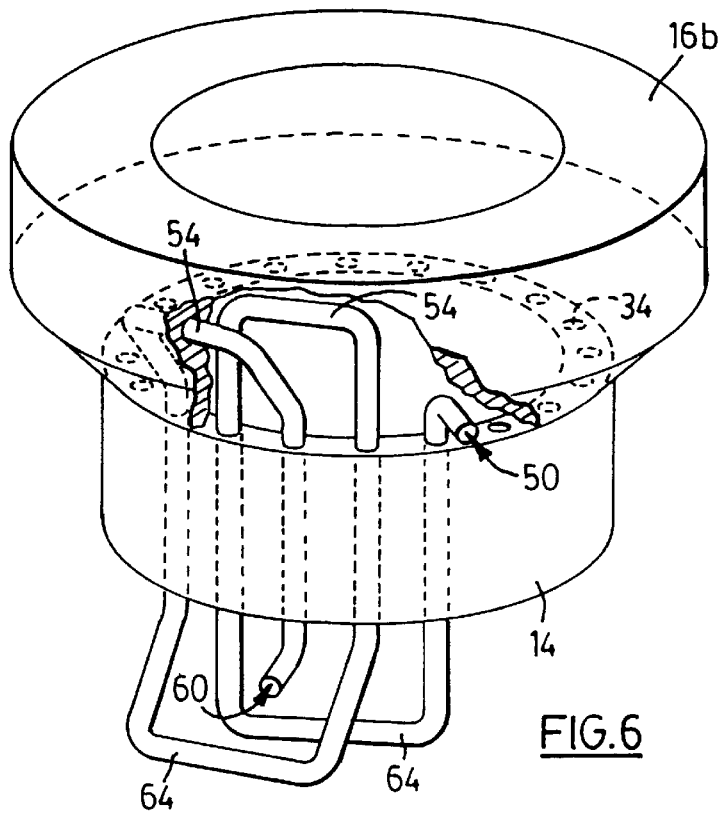
FIG. 6 is a perspective view of the portion of FIG. 3 showing the interconnections between refrigerant passages in a refrigerant circuit within the ice-making machine of FIG. 1.

FIGS. 1, 2 and 6 best illustrate the central body portion 14. As can be seen, the central body portion 14 is of a single piece construction formed from extruded aluminum and includes a cylindrical interior surface 30 which defines the heat exchange surface of the ice-making machine 10. The heat exchange surface 30 is coated with a corrosion and erosion resistant agent. The corrosion and erosion resistant agent is in turn coated with a release agent such as Teflon® to inhibit the deposition of ice crystals thereon.

A plurality of refrigerant circuits 32, in this example four, constituted by refrigerant passages 34, are integrally formed within the central body portion 14 and are circumferentially spaced about the central body portion. Each refrigerant circuit 32 includes a plurality of refrigerant passages 34, in this case five which are labelled #1 to #5. The cross-sectional area of each of the refrigerant passages 34 in each refrigerant circuit 32 is different.

Specifically, the #1 and #2 refrigerant passages 34 are elliptical and have major axes aligned with radial lines extending from the center of the central body portion 14. The #3 refrigerant passages 34 are circular. The #4 and #5 refrigerant passages 34 also are elliptical. However, the major axes of these refrigerant passages are tangential to the heat exchange surface 30. As can be seen, the #1 refrigerant passages have the smallest cross-sectional area. The cross-sectional area of the refrigerant passages 34 increases with the assigned notation so that the #5 refrigerant passages have the largest cross-sectional area. The elliptical cross-section of the #1, #2, #4 and #5 refrigerant passages 34 increases the surface area of the refrigerant passages as compared with circular passages and thereby increases heat transfer between fluid contacting the heat exchange surface 30 and refrigerant flowing through the refrigerant passages 34. This of course increases the efficiency of the ice-making machine. As one of skill in the art will appreciate, other refrigerant passage cross-sections can be selected to increase the surface area of the refrigerant passages.

The interior of each refrigerant passage 34 is preferably designed to create turbulence as refrigerant flows through the refrigerant circuits 32 to enhance boiling of the refrigerant. In this particular embodiment, this is achieved by providing a turbulent creating structure on the interior surfaces 36 of the refrigerant passages 34. Although not shown, it is preferred that the turbulent creating structure is in the form of small trapezoidal fins on the interior surfaces 36, referred to as microfins.

The spacing between adjacent refrigerant passages 34 in each of the refrigerant circuits 32 and the good thermal conductivity of the aluminum central body portion 14 allows heat transfer between the refrigerant circulating through the refrigerant passages 34 and brine solution contacting the heat exchange surface 30 to occur about generally the entire circumference of the refrigerant passages 34 and not just the portion of the refrigerant passage walls proximal to the heat exchange surface 30. This allows the efficiency of the ice-making machine 10 to be increased.

Referring now to FIGS. 1 and 6, the end plates 16 and 18 are better illustrated. The end plates 16 and 18 in this embodiment are annular and are formed in two pieces. If desired, the end plates may be casted as a single piece. Each end plate 16, 18 includes a central insert 16a, 18a formed of plastic material and an outer annular aluminum flange 16b, 18b surrounding and secured to the plastic insert 16a, 18a by suitable fasteners (not shown). The end plates 16, 18 are bolted to opposed ends of the central body portion 14.

The outer flange 16b of end plate 16 has four refrigerant inlets 50 integrally formed therein, two of which are shown in FIG. 1. Each refrigerant inlet 50 is connected to the #1 refrigerant passage 34 of a different refrigerant circuit 32 and receives a flow of refrigerant. Interconnect passages 54 are also formed in the outer flange 16b of end plate 16 and interconnect the #2 and #3 refrigerant passages 34 and the #4 and #5 refrigerant passages 34 of each refrigerant circuit 32.

The outer flange 18b of end plate 18 has four refrigerant outlets 60 formed therein, two of which are shown in FIG. 1. Each refrigerant outlet 60 is connected to the #5 refrigerant channel 34 of a different refrigerant circuit 32 and allows the refrigerant to exit the ice-making machine 10. Interconnect passages 64 are also formed in the outer flange 18b of end plate 18 to interconnect the #1 and #2 refrigerant passages 34 and the #3 and #4 refrigerant passages 34 of each refrigerant circuit 32. FIG. 6 illustrates the interconnections between the refrigerant passages 34 in one of the refrigerant circuits 32 as established by the interconnect passages 54 and 64 respectively.

The central insert 18a of end plate 18 includes a brine solution inlet 66 and an ice-brine slurry outlet 68 to permit the ingress of a brine solution or ice-brine slurry into the ice-making machine 10 and to permit the egress of an ice-slurry brine from the ice-making machine 10. The brine solution inlet 66 co-operates with a hollow shaft 70 extending from the end plate 18 and partially into the central body portion 14. A bushing 72 on the end plate 18 allows the hollow shaft 70 to rotate about its longitudinal axis relative to the end plate 18.

A drive shaft 80 extends through the central insert 16a of end plate 16 and partially into the central body portion 14 before terminating at a pointed end 82 near the open end of the hollow shaft 70. Bushings 84 on the end plate 16 allow the drive shaft 80 to be rotated about its longitudinal axis by way of a motor (not shown) relative to the end plate 16. A seal 86 acts between the central insert 16a of end plate 16 and the shaft 80 to inhibit fluid leakage.

Figure 4:
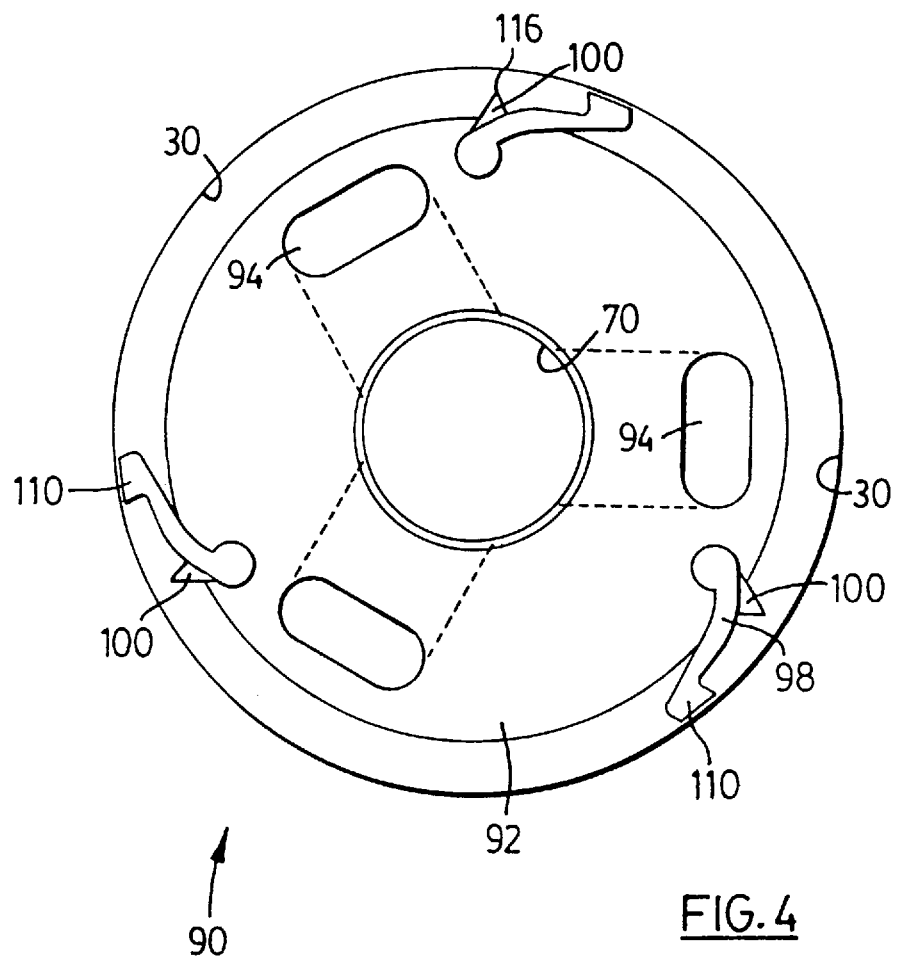
FIG. 4 is an end view of a blade assembly forming part of the ice-making machine of FIG. 1 taken in the direction of arrow 5.
Figure 5:
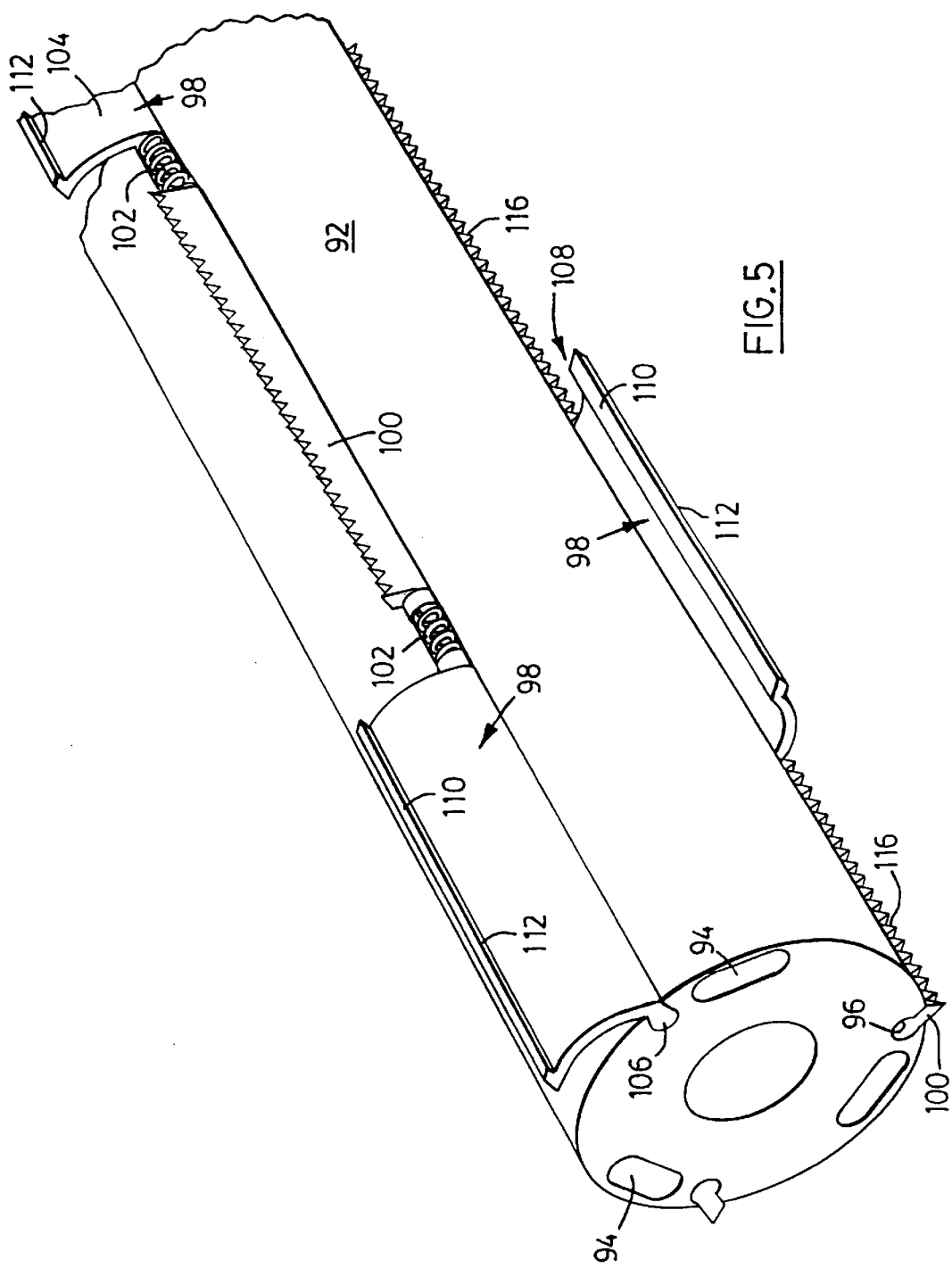
FIG. 5 is a perspective view of the blade assembly of FIG. 4.

A blade assembly 90 (best seen in FIGS. 1, 4 and 5) is mounted on the hollow, shaft 70 and drive shaft 80 and includes a cylindrical blade carrier 92 through which three circumferential spaced, inclined, generally ovate passages 94 are provided. One end of each passage 94 is in fluid communication with the open end of the hollow shaft 70 while the opposite end of each passage 94 is positioned to discharge brine solution towards the heat exchange surface 30. The passages 94 are spaced 120° about the blade carrier 92 to balance the load placed on the shaft 82 as brine solution flows along the passages 94. The radial spacing 95 between the outer surface of the blade carrier 92 and the heat exchange surface 30 is small, in this example ¼ inch, to maintain high velocity brine solution flow through the ice-making machine 10 and inhibit the formation of ice crystals on the heat exchange surface 30.

The blade carrier 92 has a plurality of equi-circumferentially spaced, longitudinal keyed slots 96 formed in its outer surface. Each keyed slot 96 receives a plurality of blades 98 separated by spacers 100. The arrangement of blades 98 and spacers 100 along each slot 96 is such that the blades 98 accommodated by the various slots 96 are longitudinally offset but slightly overlap. Since the blades 98 are spaced about the blade carrier 92 by approximately 120° and are in contact with the heat exchange surface 30, the blades 98 help to center the shaft 82 with respect to the housing 12. Springs 102 act between the blades 98 at the ends of the slots and the spacers 100 to push the blades 98 towards the respective end plates 16, 18.

Each blade 98 includes a flexible body 104 having one end 106 of a shape complimentary to the keyed slots 96. The free end 108 of the body 104 terminates in a hook 110 defining an edge 112 to contact and ride against the heat exchange surface 30. The blade 98 may be in the form of a composite with the hook 110 being formed of more rigid material than the flexible body 104. Alternatively, the blade 98 may be formed from a single rigid material and profiled to allow the body 104 to flex in the desired manner. The top surfaces of the spacers 100 are serrated to define scraper elements 116.

Figure 7:
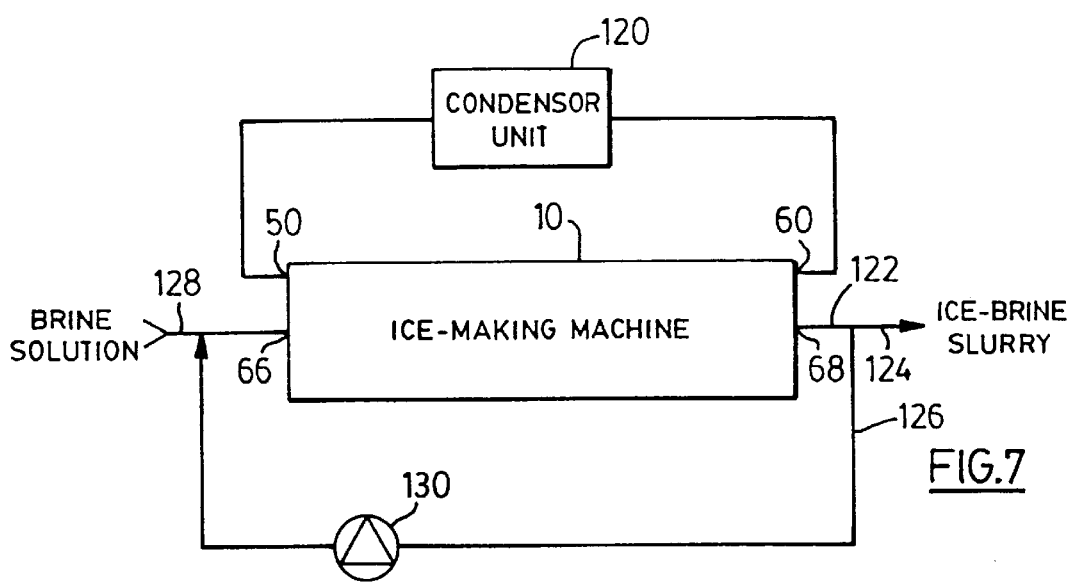
FIG. 7 is a schematic of the ice-making machine of FIG. 1 connected to an ice-brine slurry recirculation circuit.

Referring now to FIG. 7, the ice-making machine 10 is shown connected to an ice-making system. As can be seen, the refrigerant inlets 50 are connected to the outlet of a condenser unit 120 by way of an inlet header (not shown). The refrigerant outlets 60 are connected to the inlet of the condenser unit 120 by way of an outlet header (not shown). The condenser unit 120 condenses and compresses refrigerant exiting the ice-making machine 10 by way of the refrigerant outlets 60 before recirculating the refrigerant to the refrigerant inlets 50. The ice-brine slurry outlet 68 is connected to a discharge conduit 122. Discharge conduit 122 leads to an outlet 124 as well as to a recirculation conduit 126. Recirculation conduit 126 leads to an inlet conduit 128 which also receives brine solution. The inlet conduit 128 supplies brine solution and/or ice-brine slurry to the brine solution inlet 66. A pump 130 is positioned along the recirculation conduit 126 to recirculate ice-brine slurry. The amount of brine solution entering the inlet conduit 128 and mixing with the recirculated ice-brine slurry can be controlled to allow the ice fraction of ice-brine slurry produced in the ice-making machine 10 to be adjusted as desired.

The operation of the ice-making machine 10 will now be described. In operation brine solution or ice-brine slurry (hereinafter referred to as brine solution) is fed into the ice-making machine 10 through the brine solution inlet 66. The brine solution flows through the hollow shaft 70 and is then directed by the pointed end 82 of the drive shaft 80 towards the three inclined passages 94. The brine solution flows along the three inclined passages 94 until the brine solution exits the blade carrier 92 adjacent the heat exchange surface 30. While this is occurring, refrigerant enters each of the refrigerant circuits 32 by way of the refrigerant inlets 50. The refrigerant flows along the refrigerant passages 34 of each refrigerant circuit 32 and exits the refrigerant circuits 32 via the refrigerant outlets 60. As the refrigerant flows through the refrigerant passages 34 in the central body portion 14, the refrigerant absorbs heat through the heat exchange surface 30 and boils. The brine solution in contact with the heat exchange surface 30 is thus supercooled.

To avoid deposition of ice on the heat exchange surface 30 which would inhibit heat transfer to the refrigerant and thereby reduce the efficiency of the ice-making machine 10, the blade assembly 90 is rotated by the motor driven drive shaft 80. Specifically, the blade assembly 90 is rotated at a rate of speed that is fast enough to allow the blades 98 to remove the supercooled brine solution from the heat exchange surface 30 prior to crystallization of ice crystals on the heat exchange surface 30. The supercooled brine solution therefore crystallizes in the brine solution between the blade carrier 92 and the heat exchange surface 30 allowing the brine solution to act as a secondary refrigerant in the formation of fine ice crystals throughout the brine solution.

The flexible nature of the blade bodies 104 allows the blades to conform to the heat exchange surface 30 as the blades 98 are rotated. If a layer of ice should inadvertently form on the heat exchange surface 30, the blades 98 will flex until they overlie the outer surface of the blade carrier 92. When this occurs, the scraper elements 116 project radially beyond the blades 98 allowing the scraper elements 116 to scrape the ice layer and avoid damage to the blades 98.

The small radial spacing 95 between the blade carrier 92 and the heat exchange surface 30 ensures high velocity brine solution flow from the passages 94 to the ice-brine slurry outlet 68 in the end plate 18. This further assists to inhibit the formation of ice crystals on the heat exchange surface 30.

In order to increase efficiency of the ice-making machine 10, the refrigerant passages 34 in each refrigerant circuit 32 increase in cross-sectional area along the length of the refrigerant circuit. The increased cross-sectional area maintains a high velocity of refrigerant as the refrigerant circulates through the refrigerant circuits 32 while avoiding a high pressure drop along the length of the refrigerant circuits 32 helping to increase the efficiency of the ice-making machine. In addition, the staggered arrangement of the various refrigerant passages 34 in each refrigerant circuit 32 helps to equalize heat transfer over the circumference of the central body portion 14 and thereby maintain a uniform temperature within the ice-making machine 10. Moreover, the microfin structure on the interior surfaces 36 of the refrigerant passages 34 enhances boiling of the refrigerant thereby improving its heat transfer ability.

As those of skill in the art will appreciate, the present ice-making machine allows fine ice particles in a brine solution to be made efficiently by increasing and equalizing heat transfer between the brine solution and the refrigerant over basically the entire heat exchange surface.

Although the end plate 18 has been described as having the brine solution inlet and the ice-brine slurry outlet provided therein, the brine solution inlet and ice-brine slurry outlet can be provided in end plate 16 or the brine solution inlet can be provided in one end plate and the ice-brine slurry outlet can be provided in the other end plate. Also, although end plate 16 is shown to include the refrigerant inlets and end plate 18 is shown to include the refrigerant outlets, the position of the refrigerant inlets and outlets can be reversed. Also, both the refrigerant inlets and refrigerant outlets can be formed in either the end plate 16 or end plate 18 if desired.

Referring now to FIGS. 8 and 9 another embodiment of an ice-making machine in accordance with the present invention is shown. In this embodiment, like reference numerals will be used to indicate like components with a suffix "'" added for clarity. As can be seen, a plurality of ice-making machines 10' are stacked in an array. In this embodiment, the outer flanges 16b', 18b' of the end plates 16', 18' are hexagonal allowing the ice-making machines 10' to be nested. The refrigerant inlets 50' in the end plates 16' are arranged in pairs. Each pair of refrigerant inlets 50' is connected to a refrigerant conduit 200 extending between opposed sides of the end plates 16'. The open ends of the refrigerant conduits 200 are aligned with the refrigerant conduits 200 in the end plates 16' of adjacent ice-making machines 10'. O-ring seals 202 act between adjacent ice-making machines 10' to inhibit refrigerant leakage. A base 204 is attached to the end plate 16' of the bottom ice-making machine 10' of each stack to seal one end of the refrigerant conduits 200. An inlet header 206 is attached to the end plate 16' of the top ice-making machine 10' of each stack to receive a flow of refrigerant and allow the refrigerant to be delivered to each of the ice-making machines 10' in the stack.

The end plates 18 are of a similar design to allow refrigerant exiting the refrigerant circuits in each of the ice-making machines 10' to be fed to refrigerant conduits. The refrigerant conduits in the end plates 18 of the ice-making machines 10' in each stack are interconnected and lead to an outlet header attached to the top ice-making machine 10' in each stack.

Although not shown, the end plates 16' and 18' can also be designed to include a similar arrangement for the brine solution inlet and ice-brine slurry outlet. This modular design of the ice-making machines allows the ice-making machines to be arranged in an array of a size selected to produce ice-brine slurry at the desired capacity.

Although the refrigerant passages have been described as being coated with a corrosion and erosion resistant agent and receiving the flow of refrigerant directly, the refrigerant passages and interconnect passages can be lined with tubing if desired to accommodate the flow of refrigerant along the refrigerant circuits.

Although specific embodiments of the present invention have been described, those of skill in the art will appreciate that variations and modifications may be made to the present invention without departing from the scope thereof as defined by the appended claims.

I claim:

1. An ice-making machine comprising:

a housing having an inlet to receive a fluid from which ice is to be made and an outlet to permit the egress of ice from said housing;

a heat exchanger forming part of said housing having at least one solid body portion defining at least one heat exchange surface, said heat exchanger further including a refrigerant inlet, a refrigerant outlet and at least one refrigerant circuit interconnecting said refrigerant inlet and said refrigerant outlet to permit a flow of refrigerant through said heat exchanger to extract heat from fluid contacting said at least one heat exchange surface, said at least one refrigerant circuit being constituted by generally parallel refrigerant passages extending longitudinally through said at least one solid body portion at spaced locations;

blade means in contact with said at least one heat exchange surface and movable about an axis to move across said at least one heat exchange surface and remove cooled fluid therefrom; and drive means to move said blade means across said at least one heat exchange surface.

2. An ice-making machine as defined in claim 1 wherein said heat exchanger includes a plurality of refrigerant circuits, each of said refrigerant circuits being connected to said refrigerant inlet and to said refrigerant outlet, each of said refrigerant circuits being constituted by a plurality of refrigerant passages formed in said body portion.

3. An ice-making machine as defined in claim 2 wherein said housing includes a unitary, hollow solid body defining a generally cylindrical interior heat exchange surface, said refrigerant passages extending longitudinally through said body at circumferentially spaced locations generally about the entire circumference of said body.

4. An ice-making machine as defined in claim 3 wherein the cross-sectional area of the refrigerant passages in each of said refrigerant circuits is different, successive refrigerant passages having a greater cross-sectional area.

5. An ice-making machine as defined in claim 4 wherein successive refrigerant passages in each of said refrigerant circuits are positioned relative to one another to equalize heat exchange between fluid contacting said heat exchange surface and refrigerant flowing successively through said refrigerant passages.

6. An ice-making machine as defined in claim 5 wherein said body is of a one-piece construction formed of extruded aluminium and wherein said heat exchange surface is coated with a corrosion and erosion resistant agent.

7. An ice-making machine as defined in claim 6 wherein said refrigerant circuits include means to enhance boiling of said refrigerant.

8. An ice-making machine as defined in claim 3 wherein said housing further includes a pair of end plates fastened to opposed ends of said generally cylindrical body, one of said end plates accommodating said refrigerant inlet and the other of said end plates accommodating said refrigerant outlet, said end plates further including interconnect passages to interconnect successive refrigerant passages in said refrigerant circuits.

9. An ice-making machine as defined in claim 7 wherein said boiling enhancement means is in the form of a fin structure formed on surfaces of said body defining said refrigerant passages.

10. An ice-making machine comprising:
a housing having an inlet to receive a fluid from which ice is to be made and having an outlet to permit the egress of ice from said housing;
a heat exchanger forming part of said housing and having at least one solid body portion defining a generally cylindrical heat exchange surface, said heat exchanger further including a refrigerant inlet, a refrigerant outlet and at least one refrigerant circuit interconnecting said refrigerant inlet and said refrigerant outlet to permit a flow of refrigerant through said heat exchanger to extract heat from fluid contacting said heat exchange surface, said at least one refrigerant circuit being constituted by refrigerant passages extending longitudinally through said at least one solid body portion at spaced locations;
blade means in contact with said heat exchange surface and rotatable about a generally central longitudinal axis of said housing to move across said heat exchange surface and remove cooled fluid therefrom, said blade means including a rotatable blade carrier having a plurality of circumferentially spaced fluid passages extending therethrough and in fluid communication with said inlet to direct fluid entering said housing via said inlet towards said heat exchange surface and generally about its circumference as said blade carrier is rotated; and
drive means to move said blade means across said heat exchange surface.

11. An ice-making machine as defined in claim 10 wherein said inlet is positioned adjacent said central longitudinal axis of said housing, said fluid passages being angled with respect to said central longitudinal axis, each of said fluid passages having one end adjacent said inlet and an opposite end adjacent said heat exchange surface.

12. An ice-making machine as defined in claim 11 wherein said blade carrier supports a plurality of circumferentially spaced blades, each being in contact with said heat exchange surface, said blades being flexibly mounted on said blade carrier.

13. An ice-making machine comprising:
a housing having an inlet to receive a fluid from which ice is to be made and having an outlet to permit the egress of ice from said housing;
a heat exchanger forming part of said housing and having at least one solid body portion defining a generally cylindrical heat exchange surface, said heat exchanger further including a refrigerant inlet, a refrigerant outlet and at least one refrigerant circuit interconnecting said refrigerant inlet and said refrigerant outlet to permit a flow of refrigerant through said heat exchanger to extract heat from fluid contacting said heat exchange surface, said at least one refrigerant circuit being constituted by refrigerant passages extending longitudinally through said at least one solid body portion at spaced locations;
blade means in contact with said heat exchange surface and rotatable about an axis to move across said heat exchange surface and remove cooled fluid therefrom, said blade means including a rotatable blade carrier having a plurality of generally equally spaced circumferentially disposed blades thereon contacting said heat exchange surface, said blades being flexibly mounted on said blade carrier and pivoting towards said blade carrier in the event of ice accumulation on said heat exchange surface, said blade means also including scraper elements on said blade carrier and being spaced from said at least one heat exchange surface to scrape ice accumulated on said heat exchange surface, said scraper elements projecting from said blade carrier a sufficient distance to allow said blades to pivot towards said blade carrier when said scraper elements contact ice accumulated on said heat exchange surface to inhibit said blades from being pinned between ice accumulated on said heat exchange surface and said blade carrier; and
drive means to move said blade means across said heat exchange surface.

14. An ice-making machine as defined in claim 13 wherein said scraper elements are positioned between said blades.

15. An ice-making machine comprising:
a housing including a tubular main body constituted by at least one solid body portion and defining a generally cylindrical, internal heat exchange surface, a fluid inlet to receive fluid from which ice is to be made to enable said fluid to contact said heat exchange surface and circulate through said housing, and an outlet to permit the egress of ice from said housing;
blade means extending axially through said main body and contacting said heat exchange surface, said blade means being rotatable about a longitudinal axis of said housing to move across said heat exchange surface and remove cooled fluid therefrom;

a drive rotating said blade means; and at least one refrigerant circuit including a refrigerant inlet, a refrigerant outlet, and a plurality of generally parallel refrigerant passages interconnecting said refrigerant inlet and said refrigerant outlet, said refrigerant passages extending longitudinally through said at least one solid body portion at circumferentially spaced locations to permit a flow of refrigerant through successive refrigerant passages from said refrigerant inlet to said refrigerant outlet to extract heat from fluid contacting said heat exchange surface.

16. An ice-making machine as defined in claim 15 including a plurality of refrigerant circuits, each of said refrigerant circuits having a refrigerant inlet, a refrigerant outlet and a plurality of refrigerant passages extending longitudinally through said main body at circumferentially spaced locations and generally about its entire circumference.

17. An ice-making machine as defined in claim 16 wherein the refrigerant passages of each refrigerant circuit have generally constant but different cross-sectional areas.

18. An ice-making machine as defined in claim 17 wherein each successive refrigerant passage has a greater cross-sectional area.

19. An ice-making machine as defined in claim 18 wherein the refrigerant passages of each refrigerant circuit are positioned relative to one another to equalize heat exchange between fluid contacting said heat exchange surface and refrigerant flowing from through said refrigerant passages from said refrigerant inlet to said refrigerant outlet.

20. An ice-making machine as defined in claim 19 wherein the spacing between adjacent refrigerant passages in each of said refrigerant circuits and the thermal conductivity of said main body are selected to allow heat transfer between refrigerant circulating through said refrigerant passages and fluid contacting said heat exchange surface to occur generally about the entire circumference of said refrigerant passages.

21. An ice-making machine as defined in claim 20 wherein said main body is constituted by a single, solid, generally cylindrical body formed of extruded aluminum, said heat exchange surface being coated with a corrosion and erosion resistant agent.

22. An ice-making machine as defined in claim 21 wherein surfaces of said body defining said refrigerant passages have a fin structure thereon to enhance boiling of said refrigerant.

23. An ice-making machine as defined in claim 16 wherein said housing includes a pair of end plates fastened to opposed ends of said main body, said end plates including interconnect passages to interconnect successive refrigerant passages in each of said refrigerant circuits.

24. An ice-making machine as defined in claim 23 wherein the refrigerant passages in each of said refrigerant circuits are arranged about the circumference of said body to define outer refrigerant passages, at least one inner refrigerant passage and intermediate refrigerant passages between said outer refrigerant passages and said at least one inner refrigerant passage, said interconnect passages interconnecting said refrigerant passages so that refrigerant flows from said refrigerant inlet through said outer refrigerant passages, then through said at least one inner refrigerant passage and then through said intermediate refrigerant passages before reaching said refrigerant outlet.

25. An ice-making machine as defined in claim 24 wherein said outer and intermediate refrigerant passages have an elliptical circumferential configuration and wherein said at least one inner refrigerant passage has a circular circumferential configuration.

26. An ice-making machine as defined in claim 25 wherein said outer refrigerant passages are oriented so that the major axes of their circumferential configurations extend radially with respect to said longitudinal axis and wherein said intermediate refrigerant passages are oriented so that the major axes of their circumferential configurations extend tangential to said heat exchange surface.

27. An ice-making machine as defined in claim 26 wherein each successive refrigerant passage of each refrigerant circuit has a greater cross-sectional area.

28. An ice-making machine as defined in claim 27 wherein one of said end plates includes a refrigerant inlet header to supply refrigerant to each of said refrigerant inlets and wherein the other of said end plates accommodates a refrigerant outlet header interconnecting each of said refrigerant outlets.

29. An ice-making machine as defined in claim 16 wherein said blade means includes a rotatable blade carrier carrying a plurality of circumferentially spaced blades and having a plurality of circumferentially spaced fluid passages extending therethrough and in fluid communication with said inlet to direct fluid entering said housing via said inlet towards said at least one heat exchange surface and generally about its circumference as said blade carrier is rotated.

30. An ice-making machine as defined in claim 29 wherein said drive means includes a drive shaft extending into said housing along said longitudinal axis and a motor to rotate said drive shaft, said blade carrier being generally tubular and defining a central passage, said drive shaft extending partially into said central passage, said circumferentially spaced fluid passages being inclined with respect to said longitudinal axis and each having one end adjacent said heat exchange surface and another end in fluid communication with said central passage, said central passage being in fluid communication with said inlet.

31. An ice-making machine as defined in claim 30 wherein said circumferentially spaced fluid passages are equally spaced about the circumference of said blade carrier and wherein said another ends are adjacent a distal end of said drive shaft.

32. An ice-making machine as defined in claim 31 wherein the distal end of said drive shaft is configured to direct fluid entering said central passage to said circumferentially spaced fluid passages.

33. An ice-making machine as defined in claim 29 wherein said circumferentially spaced blades are pivotally mounted on said blade carrier.

34. An ice-making machine as defined in claim 33 wherein said blade carrier further includes scraper elements thereon at spaced locations, said scraper elements being spaced from said heat exchange surface.

35. An ice-making machine as defined in claim 34 wherein said scraper elements project from said blade carrier a sufficient distance to allow said blades to pivot towards said blade carrier when said scraper elements contact ice accumulated on said heat exchange surface to inhibit said blades from being pinned between ice accumulated on said heat exchange surface and said blade carrier.

36. An ice-making machine as defined in claim 35 including rows of longitudinally spaced blades carried by said blade carrier, said rows extending along said blade carrier at generally equal circumferentially spaced locations, the blades in each row being separated by scraper elements.

37. An ice-making machine as defined by claim 36 wherein the blades in successive rows are longitudinally offset.

38. An ice-making machine as defined by claim 37 further including spring elements acting between the scraper elements and blades in each row.

39. An ice-making machine as defined in claim 23 wherein one of said end plates includes a refrigerant inlet header to supply refrigerant to each of said refrigerant inlets and wherein the other of said end plates accommodates a refrigerant outlet header interconnecting each of said refrigerant outlets, said end plates being configured to allow a plurality of said ice-making machines to be stacked in an array.

40. An ice-making machine as defined in claim 39 wherein said end plates are generally hexagonal.

41. An ice-making machine as defined in claim 40 wherein said refrigerant inlet and outlet headers are positioned on said one and other end plates to align with the refrigerant inlet and outlet headers in the end plates of other ice-making machines when said ice-making machines are stacked.

42. An ice-making machine comprising:

a housing including a tubular main body constituted by at least one solid body portion and defining a generally cylindrical, internal heat exchange surface, a fluid inlet to receive fluid from which ice is to be made to enable said fluid to contact said heat exchange surface and circulate through said housing, and an outlet to permit the egress of ice from said housing;

blade means extending axially through said main body and contacting said heat exchange surface, said blade means being rotatable about a longitudinal axis of said housing to move across said heat exchange surface and remove cooled fluid therefrom;

a drive rotating said blade means; and at least one refrigerant circuit including a refrigerant inlet, a refrigerant outlet, and a plurality of refrigerant passages interconnecting said refrigerant inlet and said refrigerant outlet, said refrigerant passages extending longitudinally through said at least one solid body portion at circumferentially spaced locations to permit a flow of refrigerant through successive refrigerant passages from said refrigerant inlet to said refrigerant outlet to extract heat from fluid contacting said heat exchange surface, each of said refrigerant passages having a different, generally constant cross-sectional area, each successive refrigerant passage having a greater cross-sectional area.

43. An ice-making machine as defined in claim 42 including a plurality of refrigerant circuits, each of said refrigerant circuits having a refrigerant inlet, a refrigerant outlet and a plurality of refrigerant passages extending through said main body at circumferentially spaced locations and generally about its entire circumference.

44. An ice-making machine as defined in claim 43 wherein successive refrigerant passages in each of said refrigerant circuits are positioned relative to one another to equalize heat exchange between fluid contacting said heat exchange surface and refrigerant flowing successively through said refrigerant passages.

45. An ice-making machine as defined in claim 44 wherein said main body is of a one-piece construction formed of extruded aluminum and wherein said heat exchange surface is coated with a corrosion and erosion resistant agent.

46. An ice-making machine as defined in claim 45 wherein each of said refrigerant passages includes means to enhance boiling of said refrigerant.

47. An ice-making machine as defined in claim 45 wherein said housing further includes a pair of end plates fastened to opposed ends of said main body, one of said end plates accommodating said refrigerant inlet and the other of said end plates accommodating said refrigerant outlet, said end plates further including interconnect passages to interconnect successive refrigerant passages in said refrigerant circuits.

* * * * *